United States Patent [19]

Sher

[11] Patent Number: 5,678,887
[45] Date of Patent: Oct. 21, 1997

[54] CHILD BOOSTER SEAT

[76] Inventor: Stephen Sher, 825 Millwood Avenue, Toronto, Ontario, Canada, M4G 1W3

[21] Appl. No.: 415,402

[22] Filed: Apr. 3, 1995

[51] Int. Cl.⁶ ............................................. B60N 2/28
[52] U.S. Cl. ................. 297/250.1; 297/483; 297/DIG. 6
[58] Field of Search ........................ 297/250.1, 483, 297/DIG. 6

[56] References Cited

U.S. PATENT DOCUMENTS

| 3,093,412 | 6/1963 | Gore et al. | 297/DIG. 6 |
|---|---|---|---|
| 4,362,334 | 12/1982 | Ross et al. | 297/DIG. 6 |
| 4,588,224 | 5/1986 | Hill, Jr. | 297/DIG. 6 |
| 4,609,205 | 9/1986 | McKeever | 297/483 X |
| 4,648,625 | 3/1987 | Lynch | 297/483 X |
| 4,840,404 | 6/1989 | Falterman | 297/483 X |
| 4,938,535 | 7/1990 | Condon et al. | 297/DIG. 6 |
| 5,135,257 | 8/1992 | Short | 297/483 X |
| 5,429,418 | 7/1995 | Lipper et al. | 297/483 X |
| 5,472,236 | 12/1995 | Gray | 297/483 X |
| 5,511,854 | 4/1996 | Cordia | 297/DIG. 6 |

FOREIGN PATENT DOCUMENTS

| 251242 | 1/1988 | European Pat. Off. | 297/250.1 |
|---|---|---|---|
| 2369948 | 7/1978 | France | 297/483 |
| 2155429 | 8/1973 | Germany | 297/250.1 |
| 3513220 | 10/1986 | Germany | 297/483 |
| 3536206 | 4/1987 | Germany | 297/250.1 |
| 2012568 | 8/1979 | United Kingdom | 297/250.1 |
| 2137084 | 10/1984 | United Kingdom | 297/250.1 |
| 2154131 | 9/1985 | United Kingdom | 297/250.1 |

OTHER PUBLICATIONS

Copy of advertisement for BRITAX child car seat.
Copy of advertisement for EUROSEAT child car seat.
Copy of advertisement for SUPER-VOYAGER by KL Jeenay Co. child car seat.

*Primary Examiner*—Peter M. Cuomo
*Assistant Examiner*—David E. Allred
*Attorney, Agent, or Firm*—Bereskin & Parr

[57] ABSTRACT

A booster seat for use by children in a vehicle includes structure to position the shoulder portion of the seat belt at an appropriate position in relation to the child occupant. The belt is secured on lateral elements located on the sides of the seat back by a strap or a sleeve, which is fitted with hook and loop fasteners. The belt is slidably engaged and may be continuously and selectively positioned at the desired height for proper functioning of the belt. To prevent interference with the positioning device by the child occupying the seat, the strap may extend and be fixed to the upper surface of the lateral elements so that the end of the strap is above and behind the child's head.

15 Claims, 3 Drawing Sheets

CHILD BOOSTER SEAT

FIELD OF THE INVENTION

This invention relates to automobile booster seats for children and is particularly concerned with locating the shoulder portion of an automobile safety harness at an appropriate vertical position while the child is occupying the booster seat with the safety harness fastened.

BACKGROUND OF THE INVENTION

Booster seats are a well known way of providing comfort and safety for children sitting in seats designed for adults. When used in an automobile, they are generally secured with the common safety harness provided by the car manufacturer. The safety harness typically includes a lap belt portion and a shoulder belt portion. These safety belts are designed for the average sized adult. When the harness is fastened around the child in the booster seat, the shoulder portion of the belt is often in an incorrect vertical position in relation to the child. The belt may cross at their neck or higher which is both unsafe and uncomfortable.

An existing method of vertically positioning the shoulder belt with respect to a booster seat is to provide a series of loops on the booster seat through which the shoulder belt may be threaded. However, such a solution does not provide continuous height adjustment. An infinitely adjustable harness would accommodate a wider range of heights of the occupants.

Another solution that has been suggested is to use a safety belt locking clip equipped with one component of a hook and loop fastening system. The material of the sides of the booster seat is made from a hook and loop sensitive material to provide the other component of the hook and loop system. The locking clip may then be placed anywhere on the side of the booster seat allowing for infinite height adjustment. However, this method requires that the seat belt be threaded through the locking clip which is difficult to do and to adjust, particularly when the adult is trying to manoeuvre a squirming child into the cramped rear seat of an automobile. Furthermore once the shoulder belt is anchored in the locking clip, the length of the belt crossing the child's torso is fixed. If this portion of the belt is fastened tightly, the child will be completely immobilized and will not be able to move forward, which is uncomfortable. If, on the other hand, some slack is left in the belt, then the child will not be properly restrained by the belt should an accident occur. This type of clip thus interferes with the locking reel system used on many shoulder belts designed to allow the passenger to move freely when restraining force is not needed. Finally, as the locking clip is within easy reach of the child occupant, it is possible for the child to interfere with it and the attachment of the clip to the booster seat.

The present invention provides a child booster seat for use in association with a three point automobile shoulder safety harness which has a first belt section for securing the lap of the occupant and a second belt section extending diagonally across the torso of the occupant for securing the torso. The booster seat has a back element, a seat element extending forwardly from the back element, and a lateral skull support element extending forwardly from the back element and having an edge surface distal to the back element. The booster seat also has an engaging means, for slidably engaging the second belt section, and a hook and loop component system, with a segment of one component of the hook and loop component system fixed to the edge surface of the skull support element and a segment of the opposite component of the hook and loop component system fixed to the engaging means, so that the second belt section may be continuously and selectively positioned at a desired vertical location on the edge surface.

DESCRIPTION OF THE DRAWINGS

For a better understanding of the present invention, and to show more clearly how it may be carried into effect, reference will now be made, by way of example to a preferred embodiment of the present invention shown in the accompanying drawings in which.

DESCRIPTION OF THE PREFERRED EMBODIMENT

Figures 1, 2:
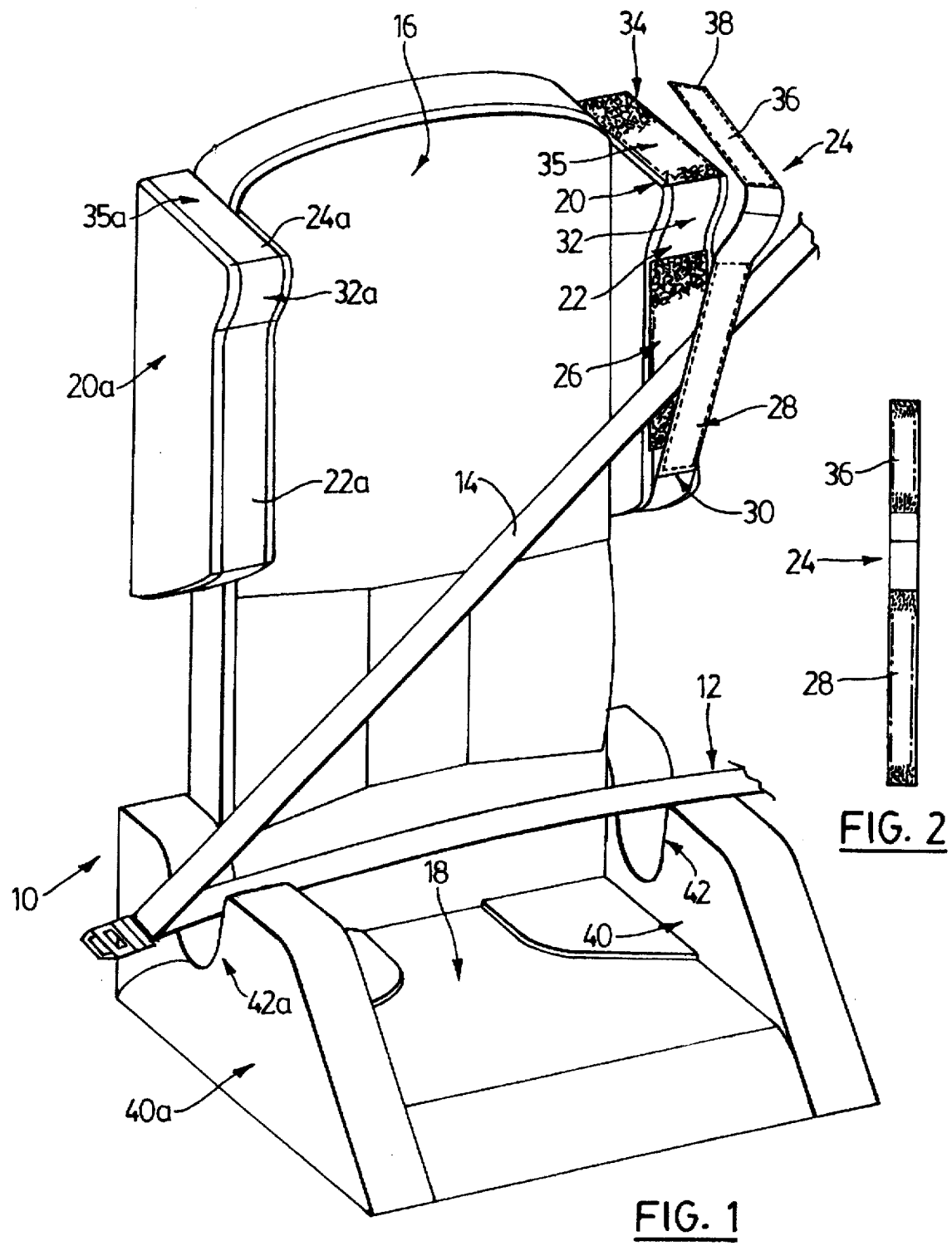
FIG. 1 is a perspective view of a booster seat according to the present invention.
FIG. 2 is a bottom view of the strap shown in FIG. 1.

Referring now to FIG. 1, the booster seat is shown generally at 10. The seat is to be used in conjunction with a three point safety harness of the type typically mounted in automobiles in front or rear passenger positions. This three point shoulder safety harness has a first belt section, 12, for securing the lap of the occupant, and a second belt section, 14, for diagonally securing the torso of the occupant.

To support the body of the occupant, the seat has a back element, 16, and a seat element, 18, extending forwardly from the back element. The seat also includes lateral skull support elements 20 and 20a, one on each side of the back element 16, extending forwardly from the back element 16. These provide lateral support for the child's head to reduce chances of injury in side impacts of the vehicle. In addition, they function as headrests for a sleeping occupant. There are edge surfaces, 22 and 22a, of lateral skull support elements 20 and 20a, distal from and substantially parallel to the general plane of back element 16. These edge surfaces, 22 and 22a, are the sites of positioning systems for vertically positioning the shoulder portion of the safety harness.

In this embodiment, there are two positioning systems, one on each side of the booster seat. The system on the left is shown in closed position, whereas the one on the right is shown partially opened.

A strap, shown in FIG. 1 at 24, functions as an engaging means to engage the second belt section 14. The strap 24 is positioned on the edge surface 22 using a hook and loop fastener such as that sold under the trade mark "VELCRO". A segment of one component of the hook and loop component system, 26, is situated on the edge surface 22 of the skull support element 20. A segment of the opposite component of the hook and loop component system, 28 (dotted lines), is on the underside of strap 24. (If segment 26 is the hook component, segment 28 is the loop component and vice versa.)

When the strap 24 is placed over the second belt section 14, the segments 26 and 28 engage above and below the lateral edges of the second belt section 14. The segments 26 and 28 are substantially greater in length than the width of the second belt section 14 which serves two functions. First, the second belt section 14 may be secured at a vertical height anywhere along the length of segment 26, thus the height adjustment is infinitely variable over the length of segment 26 with the system as shown. Second, regardless of where the belt is positioned there is, in the majority of cases, sufficient hook and loop engagement adjacent to and away from each edge of the belt to form a solid retention of the belt. Thus it is seen that second belt section 14 may be continuously and selectively secured between the strap 24 and the edge surface 22.

The segments 26 and 28 do not connect with the material of second belt section 14. Therefore when fastened in this manner there will be unimpeded movement of second belt section 14 back and forth along the length of the belt allowing the child to move forward and backward with relative ease. When the safety harness reel locks during vehicle impact, the child will be properly restrained by the belt. More importantly however, even though the belt section 14 may move back and forth along its length, it is restrained from vertical movement with respect to segment 26. The belt section 14 therefore remains where vertically positioned by strap 24.

Shown at 32 in FIG. 1 is a projection on the upper portion of the lateral skull support element 20. This is adjacent the upper limit of segment 26 in the embodiment shown in FIG. 1. In some cases, the correct position of the belt section 14 may be very close to the upper limit of the hook and loop segment 26. If this is the case, there may be very little engagement of the segments 26 and 28 to restrain vertical forces pushing the belt section 14 upwards. The projection at 32 is included to provide an extra measure of vertical restraint at this upper limit of the hook and loop segments.

Similar problems may be encountered if the correct vertical position of the belt section 14 is near the lower limit of the segment 26. There may be little of the engagement of segments 26 and 28 resisting downward vertical forces on the belt section 14. Therefore, the lower end 30 of the strap 24 may be permanently affixed to the lateral skull support element 22 to provide an extra measure of restraint against downward vertical forces.

One of the issues to be considered is whether the child occupying the booster seat will attempt to disengage the strap 24 during a trip in the vehicle. Accordingly it is desirable to make the strap difficult for the child to disengage. This could be done by making the hook and loop component fit very tight so that the child's fingers are not strong enough to disengage the segments. However this would also make it difficult for the parent to disengage the segments which is undesirable. In order to increase the difficulty a child would encounter, the preferred embodiment illustrates additional features. The strap 24 is permanently affixed at one end 30 to the lateral skull support element 20. Advantageously, the strap 24 is sewn to the booster seat. The end of the strap 30 is adjacent the child's side but the child is inhibited from disengaging the strap because the end 30 is permanently affixed. The strap 24 extends up and over the lateral skull support element 20 so that the free end 38 is attached to the upper surface of the lateral skull support element 20 at a point above and behind the occupant's head.

In this embodiment, the free end 38 of strap 24 is attached to the upper surface 35 of the lateral skull support element 20 by a second segment 34 of one component of the hook and loop component system and a second segment 36 (dotted lines) of the opposite component of the hook and loop component system. The segment 34 is fixed to the upper surface 35, and the segment 36 is fixed to the underside of the strap 24. To attach the free end of strap 38, the segments 34 and 36 are fully engaged. As the strap 24 is continuous, the engagement of segments 34 and 36 provides extra stability for the positioning system. More importantly, the free end 38 of the strap 24, is now located at a position above and behind the child's head. Thus it is extremely difficult for the child to tamper with either end of the strap as the end of the strap within the child's reach is permanently fixed, while the free end is at a location the child can not easily reach.

Segments 26 and 34 are both located on the lateral skull support element 22 and may be made of the same type of component of the hook and loop component system, whether it be hook or loop. Similarly, segments 28 and 36 are both located on the strap 24 and may also be made of the same type of component. In this case, it is possible to make the segments of each type of component continuous. Segments 26 and 34 would then merge and extend over the edge surface 22, across projection 32, and up and over the upper surface 35. Segments 28 and 36 would merge and form a single segment extending the length of the strap 24.

As illustrated in FIG. 1, the safety harness is anchored at some point above and to the right of the seat. Thus, the second belt section 14 crosses lateral skull support element 22. In other locations within the automobile, however, the anchor point of the safety harness may be at some point above and to the left of the seat. The second belt section 14 would then cross lateral skull support element 22a, rather than 22, hence the inclusion of the second positioning system located on the lateral skull support element 22a, with corresponding elements noted by the subscript "a". This second positioning system permits location of the booster seat in connection with a safety harness anchored to the left of the seat. While the invention would work with only one of these positioning systems in place, the seat could only be used with safety harnesses which are anchored on the side of the seat that the positioning system is placed on. It is preferable to include both positioning systems to give the user the ability to use the seat with safety harnesses that are anchored on either side of the seat, thus allowing flexibility to place the booster seat in the location within the automobile that is most convenient.

Referring now to FIG. 2, the underside of strap 24 is shown. The Figure illustrates the location of the hook and loop segments 28 and 36.

Figure 3:
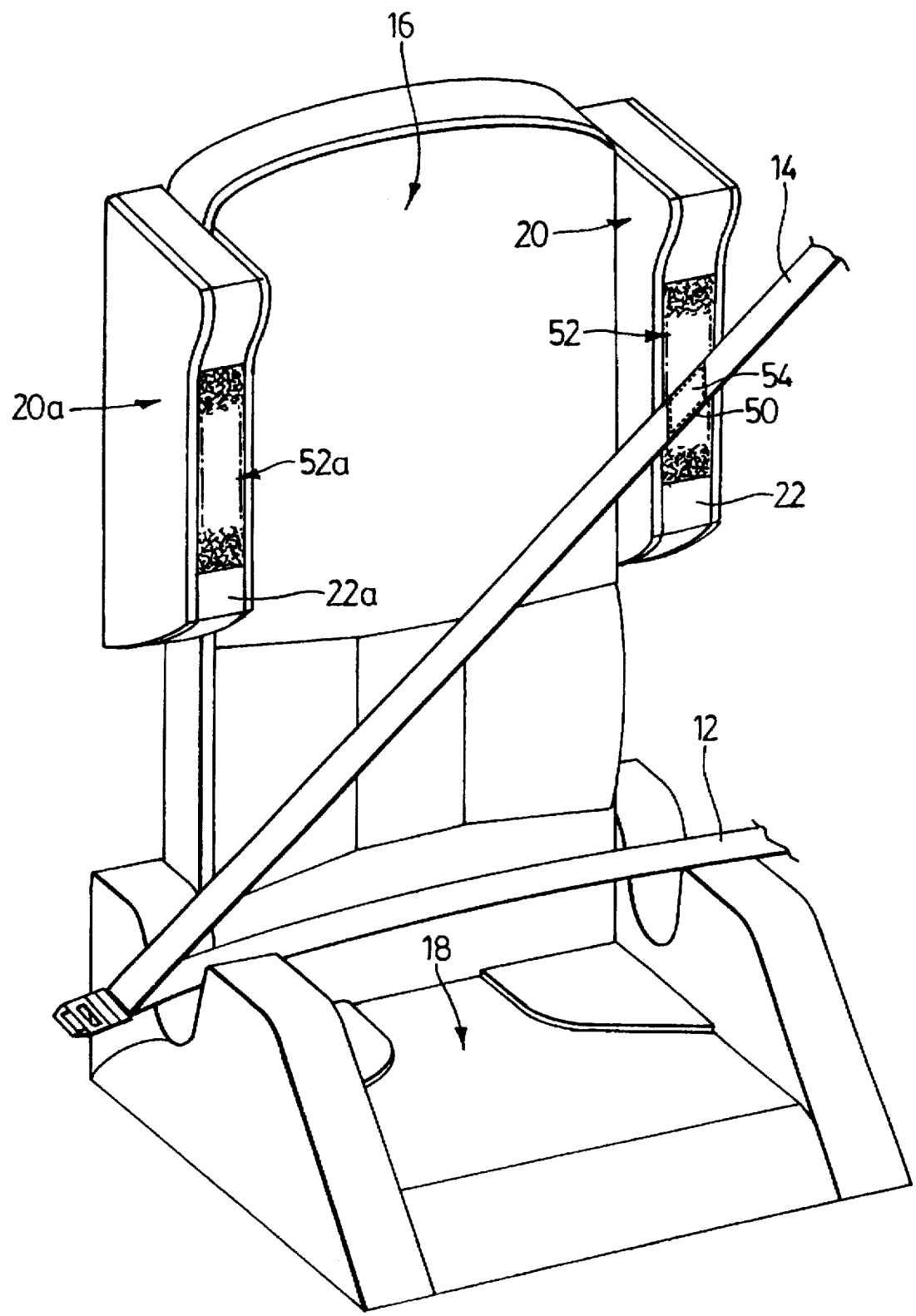
FIG. 3, is a perspective view of an alternative booster according to the present invention.

An alternative embodiment of the invention is shown in FIG. 3. Many of the elements are repeated from the first example: the first and second belt sections, 12 and 14; the back element 16; the seat element 18; the lateral skull support elements 20 and 20a with edges 22 and 22a respectively. However, in this alternative embodiment, the engaging means is provided by a sleeve, 50. The sleeve 50 envelops the second belt section 14, without attaching to it, so that the belt section 14 may move relatively freely within the sleeve 50.

A hook and loop component system is again used. In this case, two segments, 52 and 52a, of the same type of component are located on edge surfaces 22 and 22a respectively. Segment 54 (dotted lines), which is made from the opposite component of the hook and loop component system is attached to the sleeve 50.

When in use with the anchor point of the harness at some point above and to the right of the seat, as illustrated in FIG. 3, the second belt section 14 is positioned to the desired vertical position and segments 52 and 54 are engaged, anchoring the second belt section 14.

The seat may be placed in a position where the anchoring point of the safety harness will be on the opposite side of the seat at some point. In this case, the second belt section will cross the lateral skull support element 22a, rather than 22.

Here, the segments 52a and 54 may be engaged to anchor second belt section 14. Thus, the booster seat can be used in connection with any three point safety harness within the automobile, regardless of which side of the booster seat its anchor point is adjacent to. While the invention would work if only one of segments 52 or 52a were located on only one of edge surfaces 22 or 22a, it is preferable to include both to give the user the flexibility of placing the booster seat in the location within the automobile that is most convenient.

As the sleeve 50 envelopes the belt section 14, but is not attached to it, the belt section 14 slides freely within the sleeve 50. As discussed in connection with the first alternative embodiment, allowing the belt section 14 to slide freely within the engaging means minimalizes interference with the locking reel system used on many shoulder belts.

Figure 4:
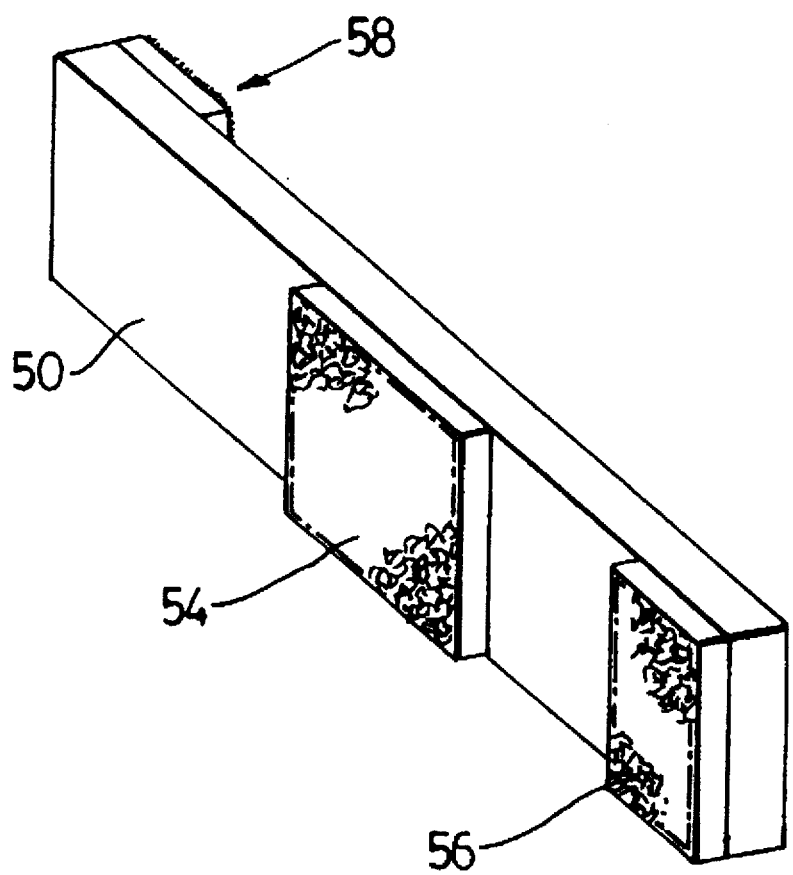
FIG. 4 is a perspective view of a sleeve for use with the booster seat of FIG. 3.

The sleeve 50 is enlarged and illustrated in FIG. 4. The sleeve comprises a rectangular band of suitable material which has a means to fasten its opposing ends to each other to form a continuous sleeve. In this example this is achieved by placing the segments 56 and 58 of another hook and loop component system at opposing ends of the band 50. Segments 56 and 58 are made from opposite of components, so that if segment 56 is hook, segment 58 is loop and vice versa. FIG. 4 also shows the segment 54 from the hook and loop component system of the positioning system (which was shown in dotted outline in FIG. 3).

It is to be understood that any suitable configuration of the sleeve and alternative means of engaging at to the belt may be used and are included within the scope of this invention.

Referring again to FIG. 1, additional features of this invention may be explained. For the comfort of the occupants, the back element 16 and the seat element 18 may be made from thick padded foam. A hinging mechanism, 40, may be included which would enable the seat element 18 to be pivoted against the back element 16 when the seat is not in use, enhancing portability and ease of storage. Finally, the seat element 18 is improved by the inclusion of lateral hip restraint elements 42 and 42a. These provide lateral support for the child's hips to reduce the chance of injury due in side impacts of the car. The lateral hip restraint elements 42 and 42a also have slots 44 and 44a. When in use, first belt section 12 is placed through these slots, so that first belt section 12 acts upon the occupant's body directly, rather than the booster seat itself. This ensures that the first belt section 12 is actually restraining the occupant, resulting in greater safety. Although illustrated in connection with FIG. 1, these additional features may be used regardless of which engaging means is used.

While the above description constitutes the preferred embodiments, it will be appreciated that the present invention is susceptible to modification and change without the parting from the fair meaning or proper scope of the accompanying claims. For example, it is to be recognized that the additional features described immediately above are merely enhancements of the booster seat and as such are advantageous but not required. As well, it may be recognized that extra vertical restraint at the upper and lower limits of the segment 26 may be provided in a number of different ways. For example, the projection 32 may be placed at the lower limit of segment 26, with the strap 24 fixed at the upper limit of segment 26, or two projections, one adjacent each end of the segment 26 may be provided, etc. However, the configuration as shown in FIG. 1 is preferred, particularly when implementing the additional feature of attaching free end of the strap to the upper surface of the lateral skull support element. Finally, in other embodiments it may not be necessary to attach one end of the strap 24. However, one may still choose to attach either end to simply insure that the strap 24 is not separated from the booster seat and misplaced.

I claim:

1. A child automobile booster seat for use in association with a three point automobile shoulder safety harness, said harness having a first belt section for securing the lap of the occupant and a second belt section for securing the torso of the occupant and extending in a diagonal fashion across the torso of the occupant, said booster seat comprising:

a back element, a seat element, extending forwardly from said back element, a lateral skull support element extending forwardly from said back element, having an edge surface distal to said back element, an engaging means for freely slidably engaging said second belt section, and a fabric strip hook and loop component system, having a fabric based continuously extending hook component and a fabric based continuously extending cooperating loop component, wherein a segment of one component of said hook and loop component system is affixed to said edge surface of said skull support element, and a segment of the other component of said hook and loop component system is affixed to said engaging means, said segment which is affixed to said edge surface having a length substantially greater than the width of said second belt section, said hook and loop component system providing infinitely continuous adjustability along the length of the components, so that said second belt section may be infinitely continuously selectively positioned at a desired vertical location on said edge surface of said lateral skull support element.

2. A device as claimed in claim 1 further comprising a projection located on said edge surface and adjacent an upper surface of said lateral skull support element for limiting vertical movement of said second belt section.

3. A device as claimed in claim 1 wherein said engaging means includes a strap.

4. A device as claimed in claim 3 in which said strap is affixed at one end to said lateral skull support element.

5. A device as claimed in claim 4, further comprising said lateral skull support element having an upper surface extending forwardly from said back element and substantially parallel to said seat element, said strap having a free end and attachment means for releasably attaching the said free end of said strap to said upper surface of said lateral skull support element.

6. A device as claimed in claim 5 wherein said attachment means comprises a second segment of one component of said hook and loop component system affixed to said upper surface of said lateral skull support element, and a second segment of the other component of said hook and loop component system affixed to said strap.

7. A device as claimed in claim 1 further comprising:

a second lateral skull support element, extending forwardly from said back element, a second engaging means for slidably engaging an alternative second belt section, wherein a segment of one component of said hook and loop component system is affixed to said edge surface of said second skull support element, and a segment of the other component of said hook and loop component system is affixed said second engaging means, said segments having lengths substantially greater than the width of said alternative second belt section, so that said second belt section may be continuously selectively positioned at a desired vertical location on said edge surface of said second lateral skull support element.

8. A device as claimed in claim 7 wherein said second engaging means includes a strap.

9. A device as claimed in claim 8 wherein said strap is affixed at one end to said second skull support element.

10. A device as claimed in claim 9, further comprising said second lateral skull support element having an upper surface extending forwardly from said back element and substantially parallel to said seat element, said strap having a free end, and attachment means for releasably attaching said free end of said strap to said upper surface of second lateral support element.

11. A device as claimed in claim 10 wherein said attachment means comprises a second segment of one component of said hook and loop component system affixed to said upper surface of said second lateral skull support element, and a second segment of the other component of said hook and loop component system affixed to said strap.

12. A device as claimed in claim 1 wherein said engaging means includes a sleeve.

13. A device as claimed in claim 12 wherein said sleeve comprises a continuous rectangular band and fastening means for fastening together opposing ends of said band.

14. A device as claimed in claim 13 wherein said fastening means comprises a hook and loop component system, a segment of one component of said hook and loop component system being affixed to one end of said band, and a segment of the opposite component of said hook and loop component system being affixed to the opposite end of said band.

15. A device as claimed in claim 12 further comprising a second lateral skull support element, extending forwardly from said back element, having an edge surface distal to said back element, and wherein a segment of the same type of component of said hook and loop component system which is affixed to said edge surface of said first lateral skull support element, is affixed to said edge surface of said second lateral skull support element, so that an alternative second belt section may be alternatively continuously selectively positioned at a desired vertical location on said edge surface of said second lateral skull support element.

\* \* \* \* \*